US012462842B2

(12) United States Patent
Zhang et al.

(10) Patent No.: US 12,462,842 B2
(45) Date of Patent: Nov. 4, 2025

(54) HARD DISK DRIVE HAVING A MOTOR ASSEMBLY WITH A ROTATIONAL BALANCING SPRING PIN

(71) Applicant: Seagate Technology LLC, Fremont, CA (US)

(72) Inventors: Li Hong Zhang, Singapore (SG); Felicisimo T. Marquez, Jr., Singapore (SG); Xiong Liu, Singapore (SG); Chee Kwong Cheng, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/407,706

(22) Filed: Jan. 9, 2024

(65) Prior Publication Data
US 2024/0265944 A1    Aug. 8, 2024

Related U.S. Application Data

(60) Provisional application No. 63/483,039, filed on Feb. 3, 2023.

(51) Int. Cl.
   *G11B 19/20* (2006.01)
(52) U.S. Cl.
   CPC ............................. *G11B 19/2009* (2013.01)
(58) Field of Classification Search
   None
   See application file for complete search history.

(56) References Cited

U.S. PATENT DOCUMENTS

| | | | | |
|---|---|---|---|---|
| 6,356,409 B1* | 3/2002 | Price | ............ | F16F 15/32 |
| | | | | 73/470 |
| 6,608,733 B2* | 8/2003 | Elsing | ............ | G11B 25/043 |
| 7,064,923 B2* | 6/2006 | Tran | ............ | G11B 19/2009 |
| 7,102,850 B1* | 9/2006 | Buzek | ............ | G11B 17/038 |
| 7,483,239 B2* | 1/2009 | Hiramatsu | ............ | G11B 17/038 |
| | | | | 360/99.08 |
| 7,926,167 B1* | 4/2011 | Liebman | ............ | G11B 19/2018 |
| | | | | 29/603.03 |
| 8,369,044 B2* | 2/2013 | Howie | ............ | G11B 25/043 |
| | | | | 360/99.12 |
| 8,437,101 B1* | 5/2013 | German | ............ | G11B 17/038 |
| | | | | 360/99.12 |
| 8,922,946 B1* | 12/2014 | Brown | ............ | G11B 17/0287 |
| | | | | 360/99.12 |
| 2002/0024762 A1* | 2/2002 | Renken | ............ | F16F 15/36 |
| 2002/0054454 A1* | 5/2002 | Chen | ............ | G11B 17/038 |
| | | | | 360/99.12 |

(Continued)

FOREIGN PATENT DOCUMENTS

| | | | | | |
|---|---|---|---|---|---|
| JP | H02166662 A | * | 6/1990 | ............ | G11B 19/20 |
| JP | 2004185736 A | * | 7/2004 | | |
| TW | 200837721 A | * | 9/2008 | ............ | F16F 15/36 |

*Primary Examiner* — William J Klimowicz
(74) *Attorney, Agent, or Firm* — Faegre Drinker Biddle & Reath LLP

(57) ABSTRACT

A hard disk drive includes at least one magnetic disk and a motor assembly. The motor assembly is configured to rotatably support the magnetic disk(s) and circumferentially rotate the magnetic disk(s) about an axis of rotation during operations of the hard disk drive. The motor assembly includes at least one rotational balancing spring pin. Each rotational balancing spring pin is configured to reduce a rotating unbalance of the motor assembly.

16 Claims, 9 Drawing Sheets

(56) References Cited

U.S. PATENT DOCUMENTS

| | | | |
|---|---|---|---|
| 2002/0191332 A1* | 12/2002 | Elsing | G11B 25/043 |
| 2005/0047003 A1* | 3/2005 | Nakamiya | G11B 19/2027 |
| 2005/0078409 A1* | 4/2005 | Elsing | G11B 17/038 |
| 2006/0119980 A1* | 6/2006 | Hiramatsu | G11B 17/038 |
| | | | 360/99.08 |
| 2007/0121242 A1* | 5/2007 | Lee | G11B 25/043 |
| | | | 360/98.02 |
| 2010/0265615 A1* | 10/2010 | Yamaguchi | G11B 17/0284 |
| | | | 360/99.12 |
| 2012/0002324 A1* | 1/2012 | Howie | G11B 33/08 |
| 2012/0069469 A1* | 3/2012 | Chiang | G11B 17/0287 |
| | | | 269/57 |

* cited by examiner

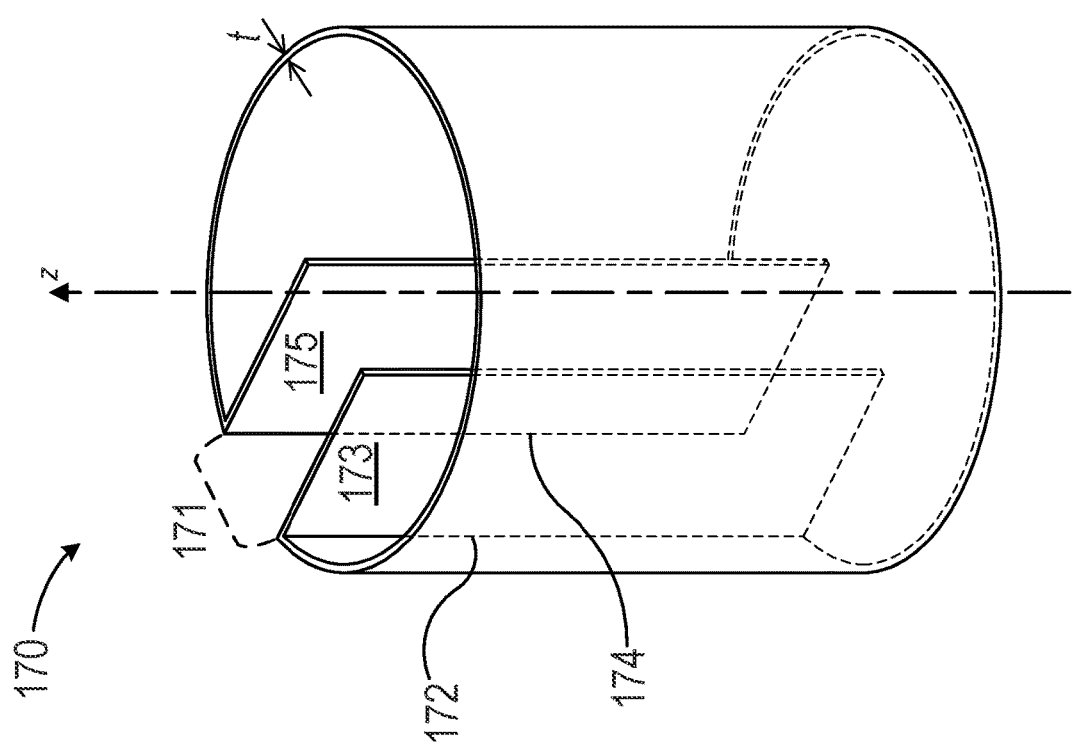

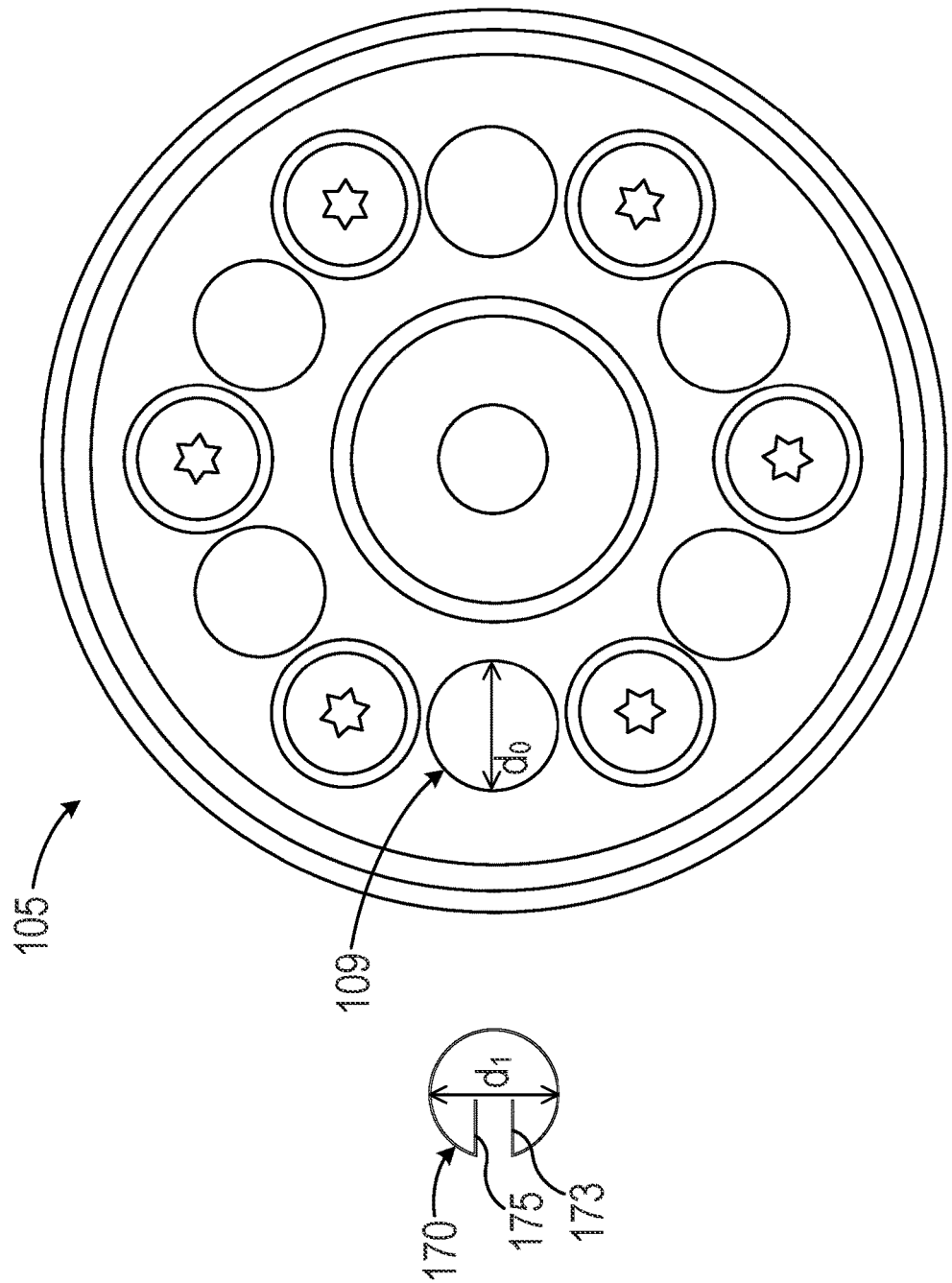

HARD DISK DRIVE HAVING A MOTOR ASSEMBLY WITH A ROTATIONAL BALANCING SPRING PIN

CROSS REFERENCE TO RELATED APPLICATIONS

This application claims priority to U.S. Provisional Patent Application No. 63/483,039, filed on Feb. 3, 2023, incorporated by reference herein for all purposes.

TECHNICAL FIELD

The disclosure relates to a motor assembly of a hard disk drive.

BACKGROUND

A hard disk drive (HDD) includes at least one magnetic disk configured to store bits of data and at least one recording head configured to write data to and read data from the magnetic disk. The HDD includes other components that are configured to assist with write and read operations. A motor assembly, for example, rotatably supports the magnetic disk(s) and rotates the magnetic disk(s) in proximity to the recording head(s). In some examples, rotating unbalance of a motor assembly in an HDD may cause wear and/or produce excess vibrations that may lead to damage and early failure of the motor assembly and/or other components of the HDD. Additionally, outgassing of some components of an HDD (e.g., components of a motor assembly) may cause formation of deposits on components of the HDD, such as recording heads, and may lead to early failure of the HDD.

SUMMARY

The present disclosure describes a hard disk drive (HDD) having a motor assembly with at least one rotational balancing spring pin. Including a rotational balancing spring pin in a motor assembly of an HDD may, in some instances, reduce rotating unbalance of the motor assembly and may extend the operating lifetime of the HDD. Additionally, utilizing rotational balancing spring pins instead of other means of reducing rotating unbalance of the motor assembly may lessen the likelihood of failure of the HDD due to formation of outgassing related deposits on recording heads of the HDD.

In one example, an HDD includes at least one magnetic disk configured to store bits of data; and a motor assembly configured to rotatably support the at least one magnetic disk and circumferentially rotate the at least one magnetic disk about an axis of rotation during operations of the hard disk drive, the motor assembly including at least one rotational balancing spring pin configured to reduce a rotating unbalance of the motor assembly.

In another example, a hard disk drive includes at least one magnetic disk configured to store bits of data; and a motor assembly configured to rotatably support the at least one magnetic disk and circumferentially rotate the at least one magnetic disk about an axis of rotation during operations of the hard disk drive, the motor assembly including at least one rotational balancing spring pin configured to reduce a rotating unbalance of the motor assembly; and a motor hub configured to support each of the at least one magnetic disk, wherein each of the at least one magnetic disk is mounted on the motor hub such that an annular volume of each of the at least one magnetic disk encircles an axially oriented portion of the motor hub, wherein the motor hub includes at least one opening in the axially oriented portion of the motor hub, and wherein each of the at least one rotational balancing spring pin is disposed in an opening of the at least one opening.

In another example, a method of making a hard disk drive includes the steps of providing at least one magnetic disk configured to store bits of data; providing a motor assembly configured to rotatably support the at least one magnetic disk and circumferentially rotate the at least one magnetic disk about an axis of rotation during operations of the hard disk drive, the motor assembly comprising at least one opening configured to accommodate a rotational balancing spring pin, the rotational balancing spring pin configured to reduce a rotating unbalance of the motor assembly; mounting each of the at least one magnetic disk on the motor assembly such that an annular volume of each of the at least one magnetic disk encircles an axially oriented portion of the motor assembly; providing at least one rotational balancing spring pin; and inserting each of the at least one rotational balancing spring pin in an opening of the at least one opening of the motor assembly.

These and other features and aspects of various examples may be understood in view of the following detailed discussion and accompanying drawings.

BRIEF DESCRIPTION OF THE DRAWINGS

FIG. 3 is a perspective view of an example rotational balancing spring pin of a motor assembly of a hard disk drive, in accordance with aspects of this disclosure.

FIGS. 4A-4D are views of an example motor assembly of a hard disk drive, in accordance with aspects of this disclosure.

DETAILED DESCRIPTION

Figure 1:
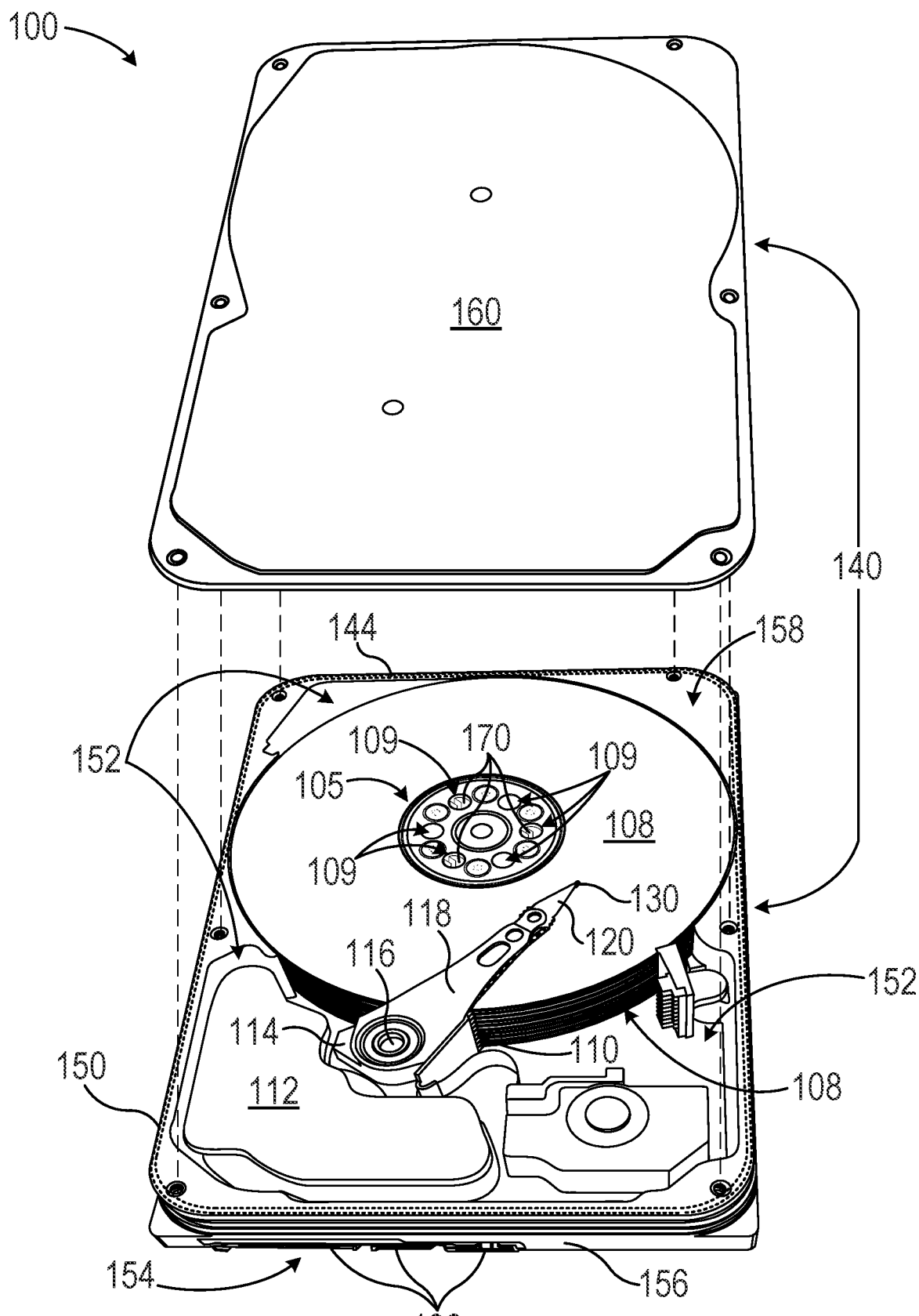
FIG. 1 is a perspective view of an example hard disk drive, in accordance with aspects of this disclosure.

FIG. 1 is a perspective view of an example hard disk drive, in accordance with aspects of this disclosure. HDD 100 includes a head stack assembly (HSA) 110, one or more magnetic disks 108 configured to store bits of data, and a motor assembly 105. HDD 100 includes an enclosure 140 configured to contain components of HDD 100. Enclosure 140 includes a base 150 and a top cover 160.

Base 150 includes a recess 152 to accommodate components of HDD 100. Base 150 further includes one or more apertures 154 through an outer wall 156 of base 150, the apertures 154 configured to access a plurality of input/output connectors 106 that are each configured to provide an interface with one or more host devices (e.g., a computer, a server, a consumer electronic device). Base 150 may be formed from any suitable material, such as metal (e.g., aluminum), plastic, or other suitable material or combinations thereof. In some examples, base 150 comprises multiple components, such as an outer frame and a bottom cover, that are coupled together (e.g., by screws, by welding).

Top cover 160 is configured to couple to base 150 to enclose components of HDD 100. Top cover 160 can be coupled to base 150 using any suitable technique, such as using one or more screws, connection fingers, locking/clipping structures, adhesives, rivets, other mechanical fasteners, welding (e.g., ultrasonic welding) or combinations thereof. In some examples, HDD 100 includes a form-in-place gasket (FIPG) 144 disposed between base 150 and top cover 160 and configured to seal an interior volume of HDD 100. One example of FIPG 144 is an epoxy (e.g., a two-part epoxy) that is applied to base 150 (e.g., surface 158 of FIG. 1) and thermally cured after coupling top cover 160 to base 150.

HSA 110 includes a plurality of head gimbal assemblies (HGA) 120. Each HGA 120 includes a recording head 130. Each recording head 130 is configured to read data from and write data to a surface of a magnetic disk 108. Each recording head 130 includes a reader and a writer. Other components of a recording head 130 (e.g., heaters, heat sinks, piezoelectric actuators) are contemplated. In the example of a heat assisted magnetic recording (HAMR) HDD, a recording head 130 may include a light source such as a laser, a waveguide, and a near-field transducer (NFT) that is configured to heat and lower the coercivity of magnetic grains in a spot of focus on a magnetic disk 108.

A voice coil drive actuator 112 produces a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus recording heads 130, to move relative to magnetic disks 108. While HDD 100 utilizes voice coil drive actuator 112 to move HGAs 120 relative to magnetic disks 108, other means of moving HGAs 120, such as a voice coil motor (VCM), are contemplated.

Motor assembly 105 is configured to rotatably support magnetic disks 108 and circumferentially rotate magnetic disks 108 about an axis of rotation during operations of HDD 100. Magnetic disks 108 are mounted on motor assembly 105 such that an annular volume of each magnetic disk 108 encircles a portion of motor assembly 105. Motor assembly 105 may rotate magnetic disks 108 during an operation of HDD 100 such that each magnetic disk 108 moves relative to a respective recording head 130 to enable the recording head 130 to read data from and/or write data to the magnetic disk 108.

In accordance with aspects of this disclosure, motor assembly 105 includes at least one rotational balancing spring pin 170 configured to reduce a rotating unbalance of motor assembly 105. In the example of HDD 100, each rotational balancing spring pin 170 is disposed in an opening 109 of a plurality of openings 109 in motor assembly. Each opening 109 may be configured to accommodate a rotational balancing spring pin 170.

In some examples, rotating unbalance of a motor assembly in an HDD may cause wear and/or produce excess vibrations that may lead to damage and early failure of the motor assembly and/or other components of the HDD. Including a rotational balancing spring pin 170 may, in some instances, reduce rotating unbalance of motor assembly 105 and may extend the operating lifetime of HDD 100. Additionally, rotational balancing spring pins 170 may provide lower outgassing than other means of reducing rotating unbalance of a motor assembly of an HDD, for example utilizing resin-based balance plugs. Outgassing in an HDD may cause formation of deposits on components of the HDD. Utilizing rotational balancing spring pins 170 may lessen the likelihood of failure of HDD 100 due to formation of these deposits on recording heads 130. Furthermore, utilizing rotational balancing spring pins 170 may provide a cost advantage over other means of reducing rotating unbalance of motor assembly 105 (e.g., resin-based balance plugs).

Figure 2:
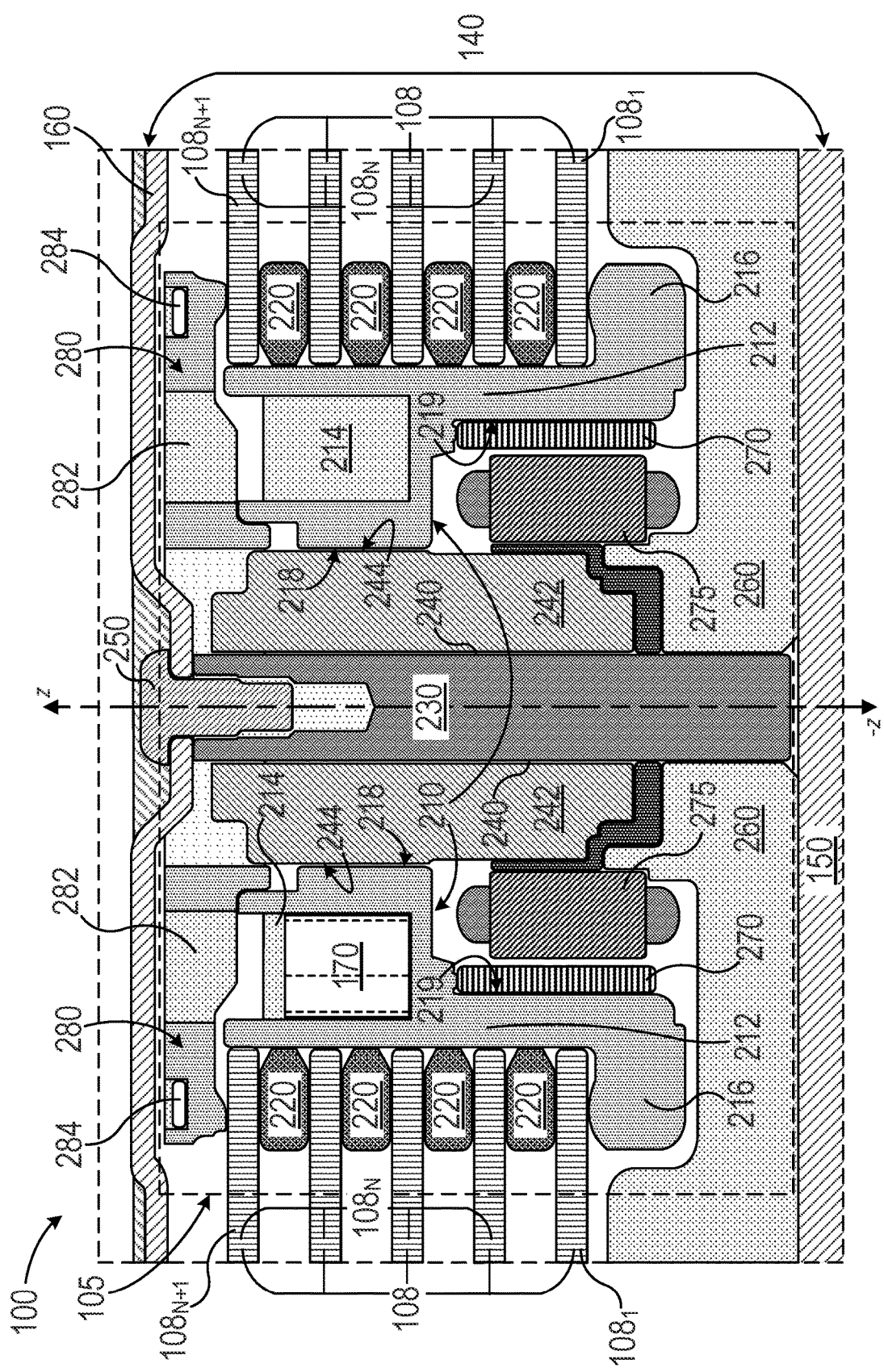
FIG. 2 is a cross-sectional view of an example hard disk drive, in accordance with aspects of this disclosure.

FIG. 2 is a cross-sectional view of an example hard disk drive, in accordance with aspects of this disclosure. FIG. 2 is a view of HDD 100 of FIG. 1. FIG. 2 includes a cross-sectional view of motor assembly 105 of HDD 100.

Motor assembly 105 is configured to rotatably support magnetic disks 108 and circumferentially rotate magnetic disks 108 about an axis of rotation z during operations of HDD 100. Motor assembly 105 includes a motor hub 210 configured to support each magnetic disk 108. Each of magnetic disks 108 is mounted on motor hub 210 such that an annular volume of each of magnetic disks 108 encircles an axially oriented (e.g., with axis of rotation z) portion 212 of motor hub 210.

Motor hub 210 includes a plurality of openings 214 in axially oriented portion 212 of the motor hub 210. Each opening 214 may be configured to accommodate a rotational balancing spring pin 170. Each rotational balancing spring pin 170 is disposed in an opening 214 of the plurality of openings 214. In the example of FIG. 2, one rotational balancing spring pin 170 is disposed in one of two openings 214 that are illustrated. However, any quantity of openings 214 and rotational balancing spring pins 170 are contemplated and considered to be within the scope of this disclosure.

Motor hub 210 includes a flange 216 that extends radially outward from a lower portion of motor hub 210. Flange 216 abuts and supports a first magnetic disk 1081 of magnetic disks 108. Additional magnetic disks $108_N$ are provided in a stacked orientation with first magnetic disk 1081, where any number N of additional magnetic disks 108 is contemplated. The stacked orientation is axially oriented, substantially parallel to and substantially coincident with the axis of rotation z. In the example of HDD 100, adjacent magnetic disks 108 provided in the stacked orientation are separated by a spacer 220, each spacer 220 having an annular shape that encircles axially oriented portion 212 of motor hub 210.

Motor assembly 105 includes a shaft 230. Shaft 230 is axially oriented substantially parallel to and substantially centered and coincident with axis of rotation z. Motor hub 210 (e.g., flange 216, axially oriented portion 212) encircles shaft 230.

In the example of FIG. 2, motor assembly further includes a radial bearing 240 that encircles a portion of shaft 230 and is configured to support circumferential rotation of motor hub 210 and each of magnetic disks 108 about shaft 230. Other example motor assemblies may include a motor hub that is coupled to a shaft (e.g., without a radial bearing), wherein both the motor hub and the shaft are rotatable about an axis of rotation of the motor assembly. Such examples of rotary shaft motor assemblies are contemplated and considered to be within the scope of this disclosure. That is, a rotational balancing spring pin of this disclosure may provide benefits to a rotary shaft motor assembly that are similar to those benefits provided to the example motor assemblies of this disclosure.

Radial bearing 240 is housed in a sleeve 242 that is disposed radially between motor hub 210 and shaft 230. An inner surface 218 of motor hub 210 faces an outer surface 244 of sleeve 242. In some examples, inner surface 218 is coupled to outer surface 244. In the example of motor assembly 105, a screw 250 couples top cover 160 of enclosure 140 to shaft 230.

Motor assembly 105 includes a motor assembly base 260 that is configured to couple motor assembly 105 to base 150 of enclosure 140 of HDD 100. Magnet(s) 270 are coupled to an inner surface 219 of motor hub 210. A stator coil 275 is mounted on motor assembly base 260 and is disposed proximal to magnet(s) 270. Stator coil 275 is configured to produce a magnetic field in response to a current passed through stator coil 275 during operations of HDD 100. The magnetic field exerts a force on magnet(s) 270 and causes motor hub 210 to rotate (e.g., about axis of rotation z).

Motor assembly 105 further comprises a clamp 280 that is coupled to motor hub 210. Clamp 280 is configured to abut and secure a top magnetic disk $108_{N+1}$ of magnetic disks 108 to motor assembly 105. Clamp 280 includes a plurality of openings 282. Each opening of the plurality of openings 282 of clamp 280 is aligned with an opening 214 of motor hub 210 to enable placement of a rotational balancing spring pin 170 through an opening 282 of clamp 280 and into an opening 214 of motor hub 210.

Motor assembly 105 further includes a balancing ring 284 configured to reduce a rotating unbalance of motor assembly 105 (e.g., in combination with one or more rotational balancing spring pins 170). Balancing ring 284 of the example of HDD 100 has a substantially annular profile and is fit inside a substantially circumferential channel along an outer edge of clamp 280.

FIG. 3 is a perspective view of an example rotational balancing spring pin of a motor assembly of a hard disk drive, in accordance with aspects of this disclosure. Rotational balancing spring pin 170 of FIG. 3 is one example of a rotational balancing spring pin 170 of FIG. 1 and FIG. 2.

Rotational balancing spring pin 170 is a rigid material that is formed into a mechanically compressible profile. In the example of rotational balancing spring pin 170 of FIG. 3, the mechanically compressible profile comprises a substantially hollow cylindrical profile having an axis z. The substantially hollow cylindrical profile terminates at an axially oriented (e.g., with axis z) gap 171 that extends through an axial dimension z of the rotational balancing spring pin 170. Axial dimension z of FIG. 3 may be parallel to axis of rotation z of FIG. 2. The mechanically compressible profile of rotational balancing spring pin 170 extends from each of two edges 172 and 174 of axially oriented gap 171 into the substantially hollow cylindrical profile to form two substantially planar parallel segments 173 and 175 that are each substantially parallel to axis z of the substantially hollow cylindrical profile.

In some examples, the rigid material of rotational balancing spring pin 170 is a metal, for example, stainless steel. Utilizing a metal such as stainless steel may enable rotational balancing spring pin 170 to have low outgassing and thus minimize the contribution of rotational balancing spring pin 170 to the formation of deposits on a recording head (e.g., a recording head 130 of HDD 100 of FIG. 1). However, other rigid materials (e.g., polymers, composites) may provide similar outgassing and/or cost advantages and are also contemplated.

Rotational balancing spring pin 170 of FIG. 3 comprises a sheet of the rigid material that is formed into the mechanically compressible profile. The sheet has a thickness t. Thickness t may be a nominal thickness of the sheet with expected manufacturing variation (e.g., +/−10%, +/−5%). In some examples, thickness t is up to about 0.5 mm. In some examples, thickness t is from about 0.02 mm to about 0.5 mm. In some examples, thickness t is from about 0.02 mm to about 0.3 mm. In some examples, thickness t is from about 0.05 mm to about 0.25 mm. In one example, thickness t is from about 0.06 mm to about 0.18 mm.

Thickness t may be associated with a mass of rotational balancing spring pin 170. For example, a rotational balancing spring pin 170 having a thickness t from about 0.05 mm to about 0.1 mm may have a mass of up to about 60 mg. A rotational balancing spring pin 170 having a thickness t from about 0.1 mm to about 0.15 mm may have a mass of up to about 110 mg. A rotational balancing spring pin 170 having a thickness t from about 0.15 mm to about 0.20 mm may have a mass of up to about 160 mg.

A particular mass of rotational balancing spring pin 170 may be selected based on a measured rotating unbalance of a motor assembly (e.g., motor assembly 105 of FIGS. 1 and 2) and a mass that is required to reduce the rotating unbalance. In some examples, rotating unbalance of the motor assembly is measured prior to placing rotational balancing spring pins in the motor assembly. Measurement of the rotating unbalance of the motor assembly may provide an estimate of the quantity, mass(es), and placement of rotational balancing spring pins 170 that are needed to reduce the rotating unbalance of the motor assembly. One or more rotational balancing spring pins 170 of given masses may be selected, for example, by measuring the thickness(es) of the rotational balancing spring pin(s) 170 and placed in desired positions on the motor assembly.

FIG. 3 illustrates one example of a rotational balancing spring pin 170 of motor assembly 105 of FIGS. 1 and 2. Rotational balancing spring pins 170 having different profiles, such as coils and closed hollow cylinders, are contemplated and considered to be within the scope of this disclosure.

FIGS. 4A-4D are views of an example motor assembly of a hard disk drive, in accordance with aspects of this disclosure. Motor assembly 105 of FIGS. 4A-4D is one example of motor assembly 105 of FIGS. 1 and 2. The views of motor assembly 105 illustrated in FIGS. 4A-4D may be a view of motor assembly 105 of FIG. 2 as viewed along the −z direction.

FIGS. 4A-4D illustrate an example of steps of inserting a rotational balancing spring pin 170 in an opening 109 of motor assembly 105. Rotational balancing spring pin 170 of FIGS. 4A-4D comprises a mechanically compressible profile. Rotational balancing spring pin 170 of FIGS. 4A-4D may be rotational balancing spring pin 170 of FIG. 3, however other example rotational balancing spring pins are considered to be within the scope of the following description.

Motor assembly 105 includes an opening 109. Opening 109 may be one of a plurality of openings in motor assembly 105 (e.g., one of openings 109 of motor assembly 105 of FIG. 1). Opening 109 is configured to accommodate rotational balancing spring pin 170. Opening 109 of FIGS. 4A-4D may comprise an opening 214 of clamp 280 of FIG. 2 or, in some examples, an opening 282 and an opening 214 of clamp 280 and motor hub 210, respectively, as illustrated in FIG. 2

FIG. 4A illustrates motor assembly 105, opening 109, and rotational balancing spring pin 170 as provided. Opening 109 as provided has an outer diameter $d_0$ (e.g., defined by outer walls of an opening 214 of motor hub 210 of FIG. 2). Rotational balancing spring pin 170 as provided has an outer diameter $d_1$ (e.g., defined by outer walls of the substantially hollow cylindrical profile of rotational balancing spring pin 170). Outer diameter $d_1$ may be similar to or greater than outer diameter $d_0$.

Figure 4B:
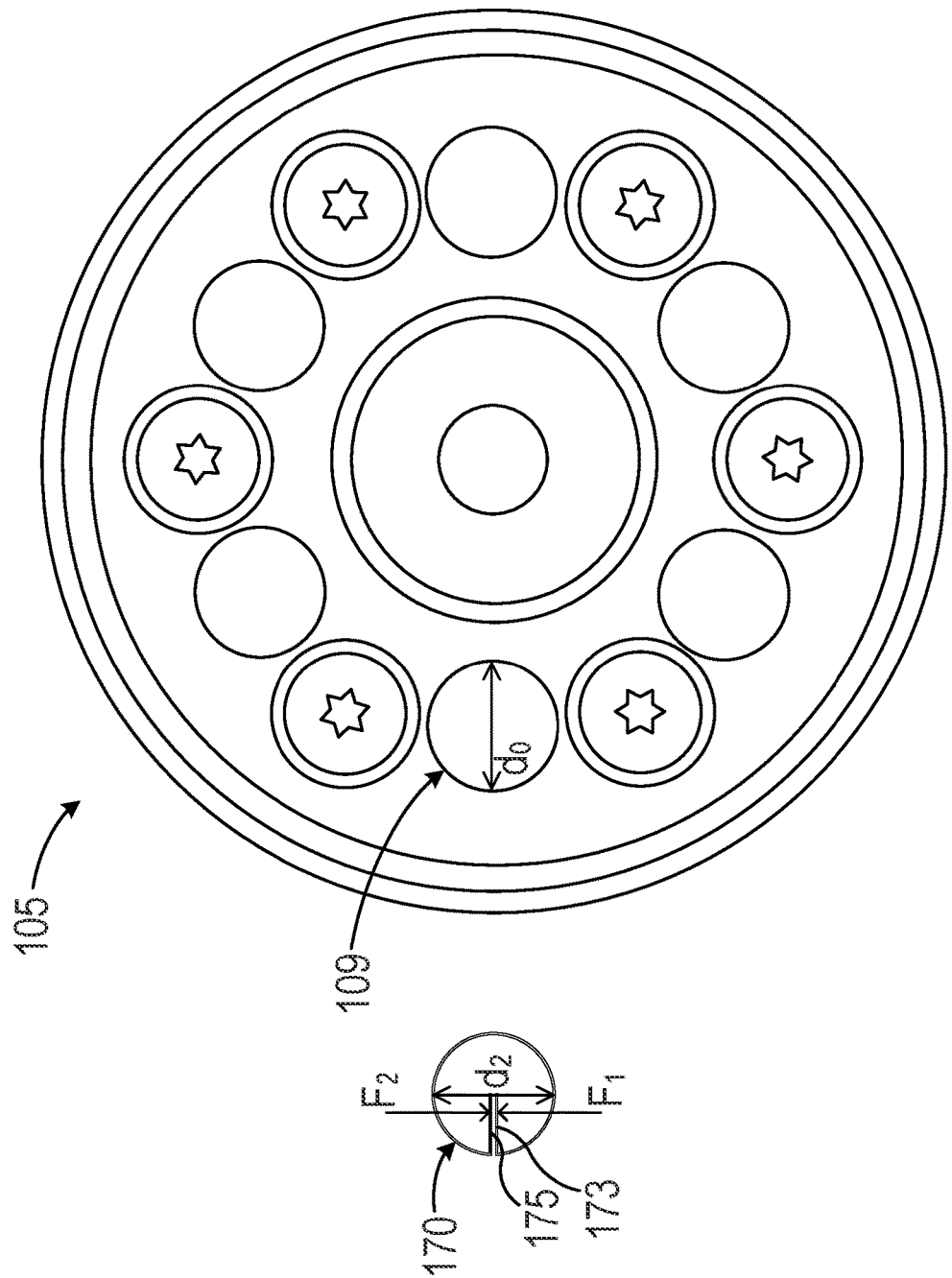

FIG. 4B illustrates an example step of compressing rotational balancing spring pin 170 to an outer diameter $d_2$ that is smaller than outer diameters do of opening 109 and $d_1$ of FIG. 4A. In the example of FIG. 4B, opposing forces $F_1$ and $F_2$ are placed on each of the two substantially planar parallel segments 173 and 175, respectively, of rotational balancing spring pin 170 such that substantially planar parallel segments 173 and 175 are pushed toward each other. In some examples, the magnitudes of forces $F_1$ and $F_2$ are approximately equal (e.g., planar parallel segments 173 and 175 are squeezed toward each other by approximately equal and opposite forces $F_1$ and $F_2$). The application of forces $F_1$ and $F_2$ compresses rotational balancing spring pin 170 from outer diameter $d_1$ to outer diameter $d_2$. In some examples, the step of compressing rotational balancing spring pin 170 illustrated in FIG. 4B is performed with a robot that is configured to compress and place rotational balancing spring pins (e.g., rotational balancing spring pin 170) into openings (e.g., opening 109) of motor assembly 105. For example, the robot may include features that are configured to apply forces $F_1$ and $F_2$ to substantially planar parallel segments 173 and 175, respectively.

Figure 4C:
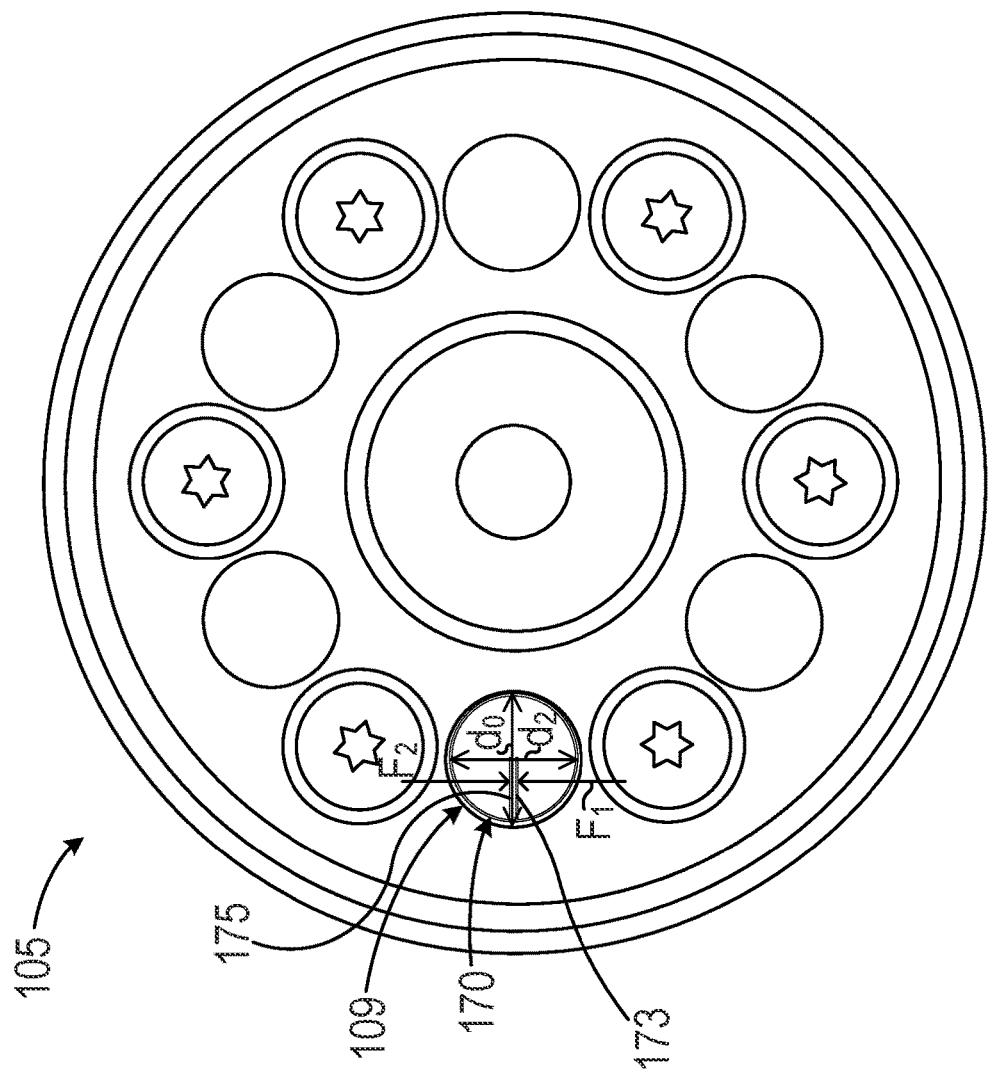

FIG. 4C illustrates an example step of placing, while compressed (e.g., compressed to diameter $d_2$), rotational balancing spring pin 170 into opening 109 of motor assembly 105. Rotational balancing spring pin 170 of FIG. 4C may remain compressed from the step of FIG. 4B, for example, by maintaining the application of forces $F_1$ and $F_2$ on substantially planar parallel segments 173 and 175, respectively, as illustrated in FIG. 4B. In some examples, the step of placing, while compressed, rotational balancing spring 170 into opening 109 is performed with a robot that is configured to compress and place rotational balancing spring pins (e.g., rotational balancing spring pin 170) into openings (e.g., opening 109) of motor assembly 105.

Figure 4D:
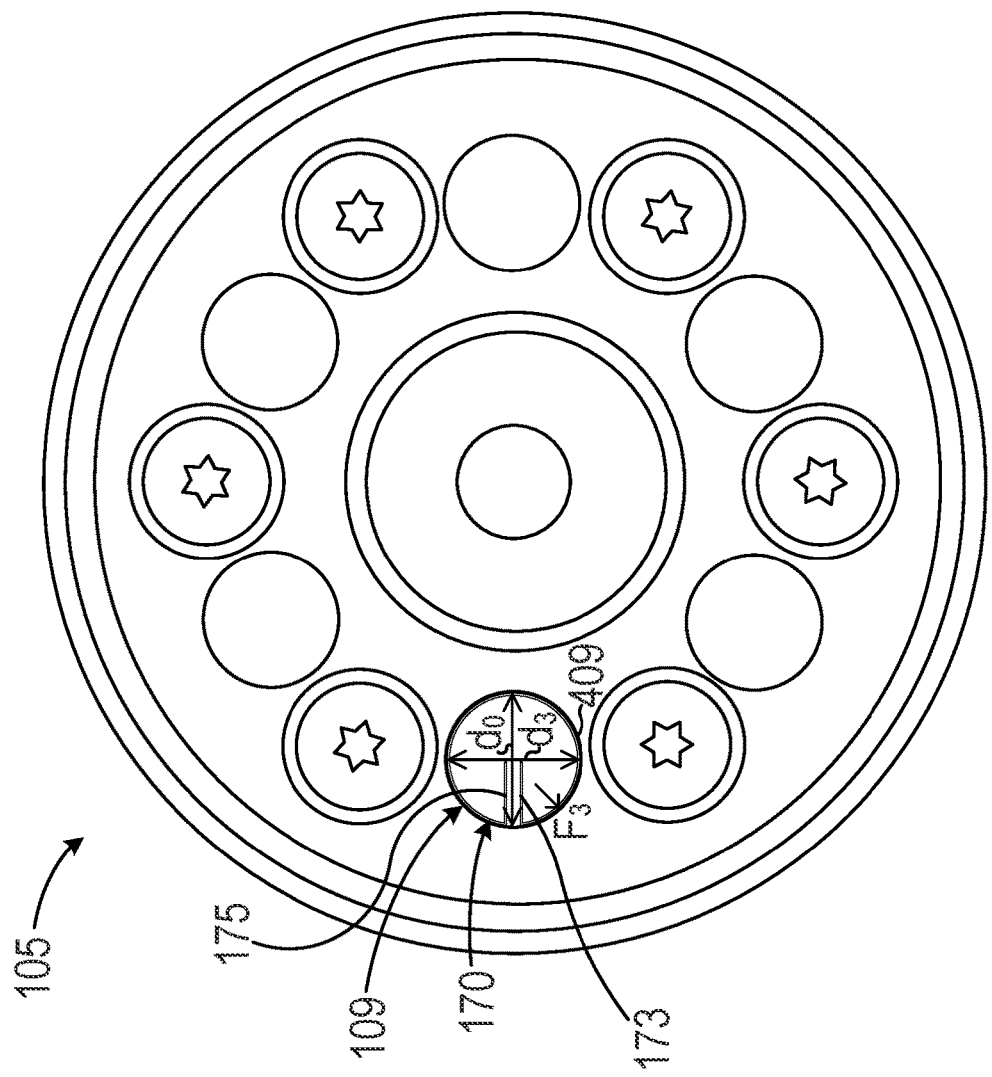

FIG. 4D illustrates an example step of uncompressing rotational balancing spring pin 170 such that rotational balancing spring pin 170 expands (e.g., from outer diameter $d_2$ of FIGS. 4B and 4C) to an outer diameter $d_3$ that is similar to outer diameter $d_0$ of opening 109. Rotational balancing spring pin 170 may exert a retaining force $F_3$ on an outer wall 409 of opening 109. Retaining force $F_3$ may be directed radially outward on outer wall 409 and may enable rotational balancing spring pin 170 to remain in place when motor assembly 105 rotates (e.g., during operations of HDD 100).

In some examples, the step of uncompressing rotational balancing spring pin 170 as illustrated in FIG. 4D includes the step of releasing opposing forces $F_1$ and $F_2$ of FIGS. 4B and 4C from each of the two substantially planar parallel segments 173 and 175, respectively, such that substantially planar parallel segments 173 and 175 move away from each other.

Figure 5A:
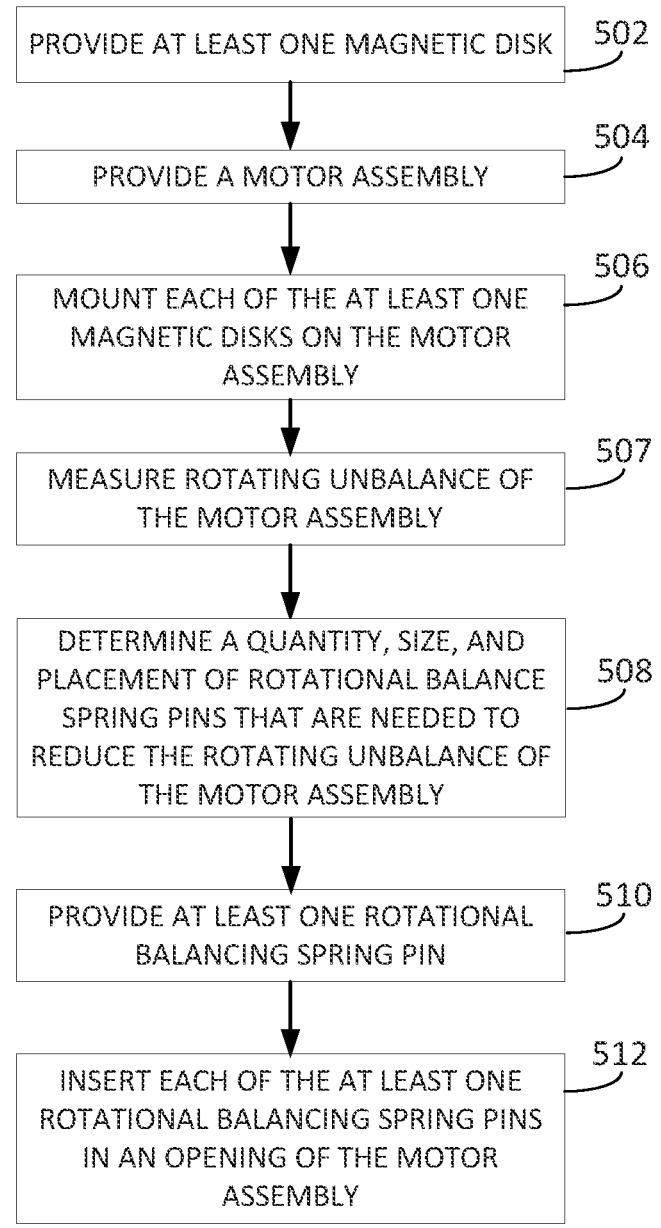
FIGS. 5A and 5B are flow diagrams illustrating a method for making a hard disk drive, in accordance with aspects of this disclosure.
Figure 5B:
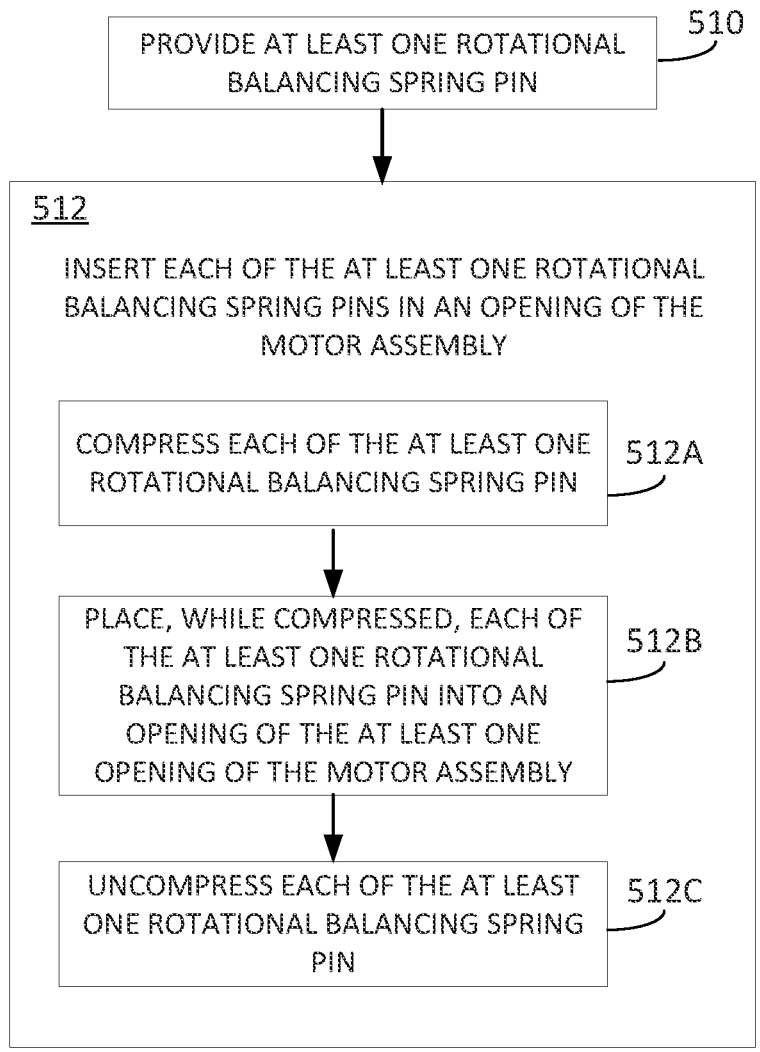

FIGS. 5A and 5B are flow diagrams illustrating a method for making a hard disk drive, in accordance with aspects of this disclosure. FIGS. 5A and 5B are described with reference to HDD 100 of FIGS. 1 and 2, and with reference to rotational balancing spring pin 170 of FIG. 3.

In accordance with aspects of this disclosure, a method of making HDD 100 as illustrated in FIG. 5A includes the steps of providing at least one magnetic disk (502); providing a motor assembly (504); mounting each of the at least one magnetic disk on the motor assembly (506); providing at least one rotational balancing spring pin (510); and inserting each of the at least one rotational balancing spring pin in an opening of the motor assembly (512).

The at least one magnetic disk of steps 502 and 506 is configured to store bits of data and may be a magnetic disk(s) 108 of FIGS. 1 and 2. The motor assembly of steps 504, 506, and 512 is configured to rotatably support the at least one magnetic disk and circumferentially rotate the at least one magnetic disk about an axis of rotation during operations of the hard disk drive. The motor assembly of steps 504, 506, and 512 may be motor assembly 105 of FIGS. 1, 2, and/or 4A-4D. Each of the at least one magnetic disk of steps 502 and 506 is mounted on the motor assembly in step 506 such that an annular volume of each of the at least one magnetic disk encircles an axially oriented portion of the motor assembly.

The motor assembly of steps 504, 506, and 512 includes at least one opening (e.g., the opening of step 512) configured to accommodate a rotational balancing spring pin (e.g., the rotational balancing spring pin of steps 510 and 512). The opening of the motor assembly of step 512 may be an opening 109 of motor assembly 105 of FIGS. 1 and/or 4A-4D, and/or an opening 214 and/or 282 of motor hub 210 and clamp 280, respectively, of FIG. 2 (e.g., a combination of an opening 214 and an opening 282).

Each of the at least one rotational balancing spring pin is configured to reduce a rotating unbalance of the motor assembly. The rotational balancing spring pin of steps 510 and 512 may be a rotational balancing spring pin 170 of FIGS. 1, 2, 3, and/or 4A-4D, or another rotational balancing spring pin having a mechanically compressible profile.

The method illustrated in FIG. 5A may further include the steps of measuring rotating unbalance of the motor assembly (507) and determining a quantity, size, and placement of rotational balancing spring pins that are needed to reduce the rotating unbalance of the motor assembly (508) between the steps of mounting each of the at least one magnetic disks on the motor assembly (506) and inserting each of the at least one rotational balancing spring pins in an opening of the motor assembly (512).

FIG. 5B further describes steps of providing at least one rotational balancing spring pin (510) and inserting each of the at least one rotational balancing spring pin in an opening of the motor assembly (512) of FIG. 5A. FIG. 5B may describe, fully or in part, methods illustrated in FIGS. 4A-4D.

The step of inserting each of the at least one rotational balancing spring pin in an opening of the at least one opening of the motor assembly (512) includes the steps of compressing each of the at least one rotational balancing spring pin (512A); placing, while compressed, each of the at least one rotational balancing spring pin into an opening of the at least one opening of the motor assembly (512B); and uncompressing each of the at least one rotational balancing spring pin (512C).

The step of compressing each of the at least one rotational balancing spring pin (512A) includes compressing each of the at least one rotational balancing spring pin to an outer dimension that is smaller than an outer dimension of an opening of the at least one opening of the motor assembly. One example of step 512A is illustrated in FIG. 4B, where rotational balancing spring pin 170 is compressed to an outer diameter $d_2$ that is smaller than outer diameter $d_0$ of opening 109. Step 512A may include placing opposing forces on features or surfaces of the rotational balancing spring pin (e.g., as illustrated in FIG. 4B, placing opposing forces $F_1$ and $F_2$ on each of the two substantially planar parallel segments 173 and 175, respectively, of rotational balancing spring pin 170) to compress the rotational balancing spring pin. In some examples, the step of compressing each rotational balancing spring pin of step 512A is performed with a robot that is configured to compress and place rotational balancing spring pins into openings of a motor assembly. For example, that robot may include features that are configured to apply opposing forces to features or surfaces of a rotational balancing spring pin to compress the rotational balancing spring pin.

One example of step 512B is illustrated in FIG. 4C, where rotational balancing spring pin 170 of FIG. 4C may remain compressed from the step of FIG. 4B, for example, by maintaining the application of forces $F_1$ and $F_2$ on substantially planar parallel segments 173 and 175, respectively, as illustrated in FIG. 4B. In some examples, the step of placing, while compressed, each of the at least one rotational balancing spring pin into an opening of the at least one opening of the motor assembly (512B) is performed with a robot that is configured to compress and place rotational balancing spring pins into openings of a motor assembly.

The step of uncompressing each of the at least one rotational balancing spring pin (512C) includes uncompressing each of the at least one rotational balancing spring pin such that each of the at least one rotational balancing spring pin expands to an outer dimension that is similar to an outer dimension of the opening in which the rotational balancing spring pin is placed and exerts a retaining force on an outer wall of the opening. One example of step 512C is illustrated in FIG. 4D, where rotational balancing spring pin 170 expands (e.g., from outer diameter $d_2$ of FIGS. 4B and 4C) to an outer diameter $d_3$ that is similar to outer diameter $d_0$ of opening 109 and may exert a retaining force $F_3$ on an outer wall 409 of opening 109. The step of uncompressing each of the at least one rotational balancing spring pin (512C) may include the step of releasing opposing forces that were previously applied to features or surfaces of the rotational balancing spring pin. For example, as illustrated in FIG. 4D, step 512C of FIG. 5B may include the step of releasing opposing forces $F_1$ and $F_2$ of FIGS. 4B and 4C from each of the two substantially planar parallel segments 173 and 175, respectively, such that substantially planar parallel segments 173 and 175 move away from each other.

Various examples have been presented for the purposes of illustration and description. These and other examples are within the scope of the following claims.

What is claimed is:

1. A hard disk drive comprising:
at least one magnetic disk; and
a motor assembly configured to rotatably support the at least one magnetic disk and circumferentially rotate the at least one magnetic disk about an axis of rotation during operations of the hard disk drive,
the motor assembly comprising a mass configured to reduce a rotating unbalance of the motor assembly, the mass consisting of a hollow rotational balancing spring pin,
wherein the hollow rotational balancing spring pin comprises a rigid material that is formed into a mechanically compressible profile,
wherein the mechanically compressible profile comprises a substantially hollow cylindrical profile,
wherein the substantially hollow cylindrical profile terminates at an axially oriented gap that extends through an axial dimension of the rotational balancing spring pin,
wherein the mechanically compressible profile extends from each of two edges of the axially oriented gap into the substantially hollow cylindrical profile to form two substantially planar parallel segments that are each substantially parallel to an axis of the substantially hollow cylindrical profile.

2. The hard disk drive of claim 1, wherein the rigid material is a metal.

3. The hard disk drive of claim 2, wherein the metal is stainless steel.

4. The hard disk drive of claim 1, wherein the hollow rotational balancing spring pin comprises a sheet comprising the rigid material.

5. The hard disk drive of claim 4, wherein the sheet has a thickness of about 0.02 millimeters to about 0.5 millimeters.

6. A hard disk drive comprising:
at least one magnetic disk; and
a motor assembly configured to rotatably support the at least one magnetic disk and circumferentially rotate the at least one magnetic disk about an axis of rotation during operations of the hard disk drive, the motor assembly comprising:
a mass configured to reduce a rotating unbalance of the motor assembly, the mass consisting of a hollow rotational balancing spring pin, and
a motor hub configured to support each of the at least one magnetic disk,
wherein each of the at least one magnetic disk is mounted on the motor hub such that an annular volume of each of the at least one magnetic disk encircles an axially oriented portion of the motor hub,
wherein the motor hub comprises an opening in the axially oriented portion of the motor hub,
wherein each of the hollow rotational balancing spring pin is disposed in the opening.

7. The hard disk drive of claim 6,
wherein the motor hub comprises a flange that extends radially outward from a lower portion of the motor hub, and
wherein the flange abuts and supports a magnetic disk of the at least one magnetic disk.

8. The hard disk drive of claim 7,
wherein the magnetic disk is a first magnetic disk of the at least one magnetic disk,
wherein additional magnetic disks of the at least one magnetic disk are provided in a stacked orientation with the first magnetic disk,
wherein the stacked orientation is axially oriented, substantially parallel to and substantially coincident with the axis of rotation.

9. The hard disk drive of claim 8, wherein adjacent magnetic disks provided in the stacked orientation are separated by a spacer, each spacer having an annular shape that encircles the axially oriented portion of the motor hub.

10. The hard disk drive of claim 6, wherein the motor assembly further comprises:
a shaft that is axially oriented substantially parallel to and substantially centered and coincident with the axis of rotation; and
a radial bearing configured to support circumferential rotation of the motor hub and each of the at least one magnetic disk about the shaft,
wherein the radial bearing encircles a portion of the shaft.

11. The hard disk drive of claim 10, wherein the radial bearing is housed in a sleeve that is disposed radially between the motor hub and the shaft.

12. The hard disk drive of claim 11, wherein an inner surface of the motor hub faces an outer surface of the sleeve.

13. The hard disk drive of claim 6, wherein the motor assembly further comprises a motor assembly base that is configured to couple the motor assembly to a base of an enclosure of the hard disk drive.

14. The hard disk drive of claim 6,
wherein the motor assembly further comprises a clamp that is coupled to the motor hub and is configured to abut and secure a top magnetic disk of the at least one magnetic disk to the motor assembly,
wherein the clamp comprises a clamp opening aligned with the opening of the motor hub.

15. The hard disk drive of claim 14,
wherein the motor assembly further comprises a balancing ring configured to reduce a rotating unbalance of the motor assembly, the balancing ring having a substantially annular profile, and
wherein the balancing ring is fit inside a substantially circumferential channel along an outer edge of the clamp.

16. A method of making a hard disk drive, the method comprising the steps of:

providing a motor assembly configured to rotatably support at least one magnetic disk and circumferentially rotate the at least one magnetic disk about an axis of rotation during operations of the hard disk drive, the motor assembly comprising an opening;

mounting each of the at least one magnetic disk on the motor assembly such that an annular volume of each of the at least one magnetic disk encircles an axially oriented portion of the motor assembly; and reduce a rotating unbalance of the motor assembly by inserting a mass into the opening of the motor assembly, the mass consisting of a hollow rotational balancing spring pin.

* * * * *